United States Patent
Hao

(10) Patent No.: US 10,345,666 B2
(45) Date of Patent: Jul. 9, 2019

(54) ARRAY SUBSTRATE AND LIQUID CRYSTAL DISPLAY PANEL

(71) Applicant: Shenzhen China Star Optoelectronics Semiconductor Display Technology Co., Ltd., Shenzhen (CN)

(72) Inventor: Sikun Hao, Shenzhen (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 33 days.

(21) Appl. No.: 15/573,056

(22) PCT Filed: Apr. 18, 2017

(86) PCT No.: PCT/CN2017/080932
§ 371 (c)(1),
(2) Date: Nov. 9, 2017

(87) PCT Pub. No.: WO2018/161410
PCT Pub. Date: Sep. 13, 2018

(65) Prior Publication Data
US 2018/0356700 A1   Dec. 13, 2018

Related U.S. Application Data

(63) Continuation of application No. PCT/CN2017/080932, filed on Apr. 18, 2017.

(30) Foreign Application Priority Data

Mar. 8, 2017 (CN) .......................... 2017 1 0136099

(51) Int. Cl.
G02F 1/1362 (2006.01)
G09G 3/36 (2006.01)
G02F 1/1335 (2006.01)

(52) U.S. Cl.
CPC ...... *G02F 1/136286* (2013.01); *G02F 1/1362* (2013.01); *G02F 1/133514* (2013.01);
(Continued)

(58) Field of Classification Search
None
See application file for complete search history.

(56) References Cited

U.S. PATENT DOCUMENTS

2006/0176256 A1* 8/2006 Yen ................. G09G 3/3688
345/88
2015/0228214 A1 8/2015 Liao et al.
2017/0301696 A1* 10/2017 Yang ................. H01L 27/32

FOREIGN PATENT DOCUMENTS

CN    103135295 A    6/2013
CN    103887307 A    6/2014
(Continued)

Primary Examiner — Edward J Glick
Assistant Examiner — Anthony G Quash
(74) Attorney, Agent, or Firm — Mark M. Friedman

(57) ABSTRACT

An array substrate includes a plurality of display pixels arranged in an array. Each of the plurality of display pixels comprises a red subpixel R, a green subpixel G, and a blue subpixel B. Six of the consecutive display pixels arranged horizontally and/or longitudinally as a whole are repeatedly arranged in a pixel unit. An arrangement order of the subpixels in each of the six consecutive display pixels is totally different. The subpixels in the six consecutive display pixels are arranged as RGB, RBG, GRB, GBR, BRG, and BGR successively. The technical problems of the conventional tri-gate driver structure, such as poor image display (Continued)

and display quality, are resolved due to poor charging ability of pixels which are inclined to incomplete charging.

14 Claims, 3 Drawing Sheets

(52) U.S. Cl.
CPC ............... *G09G 3/3607* (2013.01); *G02F 2001/136222* (2013.01); *G02F 2201/52* (2013.01); *G09G 2300/0452* (2013.01); *G09G 2320/0242* (2013.01)

(56) References Cited

FOREIGN PATENT DOCUMENTS

| CN | 104483794 A | 4/2015 |
| CN | 104678670 A | 6/2015 |
| CN | 104992957 A | 10/2015 |

* cited by examiner

|  | D1 | D2 | D3 | D4 | D5 | D6 |
|---|---|---|---|---|---|---|
| G1 | R | R | G | G | B | B |
| G2 | G | B | R | B | R | G |
| G3 | B | G | B | R | G | R |
| G4 | R | G | G | B | B | R |
| G5 | B | R | B | R | G | G |
| G6 | G | B | R | G | R | B |
| G7 | G | G | B | B | R | R |
| G8 | R | B | R | G | G | B |
| G9 | B | R | G | R | B | G |
| G10 | G | B | B | R | R | G |
| G11 | B | R | G | G | B | R |
| G12 | R | G | R | B | G | B |
| G13 | B | B | R | R | G | G |
| G14 | R | G | G | B | R | B |
| G15 | G | R | B | G | B | R |
| G16 | B | R | R | G | G | B |
| G17 | G | G | B | R | B | R |
| G18 | R | B | G | B | R | G |

Fig. 5

ARRAY SUBSTRATE AND LIQUID CRYSTAL DISPLAY PANEL

BACKGROUND

1. Field of the Disclosure

The present disclosure relates to the technical field of liquid crystal display, and more particularly, to an array substrate and a liquid crystal display (LCD) including the array substrate.

2. Description of the Related Art

A liquid crystal display (LCD) is by far one of the most widely used flat display. The LCD, as a display including a color screen with a high resolution, has been widely applied to a variety of electronic devices such as mobile phones, personal digital assistants (PDAs), digital cameras, computer screens, and laptop screens. used monitor with a high resolution color screen. A conventional, widely applied liquid crystal display is formed by upper and lower substrates and a medial liquid crystal layer. The substrates are formed by glass and an electrode, etc. When the upper and lower substrates in the display include an electrode, the display is at a longitudinal electric field mode such as a twist nematic (TN) mode, a vertical alignment (VA) mode, and a multi-domain vertical alignment (MVA), which aim to address too narrow development of a viewing angle. Different from the above-mentioned display, another kind of display includes a single electrode arranged on one side of the substrate and forms a horizontal electric field mode such as an in-plane switching (IPS) mode, a fringe field switching (FFS) mode, etc.

FIG. 1 illustrates two driver structures commonly used by a conventional LCD, that is, a tri-gate driver structure. A data line reduces to one-third of a normal driver structure, and a gate line becomes three times the normal driver structure. So a data chip on film (COF) of the tri-gate driver structure reduces to one-third of the normal driver structure. The width of each gate pulse and the charging time of each gate pulse reduce to one-third of the normal driver structure as well.

FIG. 2 is a single color image of the tri-gate driver structure. A driver waveform of the displayed single color image is shown in FIG. 2. A voltage applied on a data line voltage 101 and a voltage applied on an integrated circuit (IC) driver voltage 102 are constantly at the status of variation (high and low) so the single color image is an overloading image for the tri-gate driver structure. In other words, the pixel charging ability is substandard, which easily causes inadequate charging, bad image display, and deficient display qualities.

SUMMARY

An object of the present disclosure is to propose an array substrate which can compensate a pixel under charging for brightness. A conventional tri-gate driver structure is poor for pixel charging ability, resulting in a pixel with a specific color under charging and further poorer display. The array substrate proposed by the present disclosure can be substituted for the conventional tri-gate driver structure.

According to the present disclosure, an array substrate comprises a plurality of display pixels arranged in an array. Each of the plurality of display pixels comprises a red subpixel R, a green subpixel G, and a blue subpixel B. The array substrate adopts a tri-gate structure. The subpixels are arranged horizontally. A row of the subpixels is connected to a gate line. Six of the consecutive display pixels arranged horizontally and/or longitudinally as a whole are repeatedly arranged in a pixel unit. An arrangement order of the subpixels in each of the six consecutive display pixels is totally different. The subpixels in the six consecutive display pixels are arranged as RGB, RBG, GRB, GBR, BRG, and BGR successively.

According to an embodiment of the present disclosure, the six consecutive display pixels are arranged longitudinally. Color of each of the subpixels in the same row is identical.

According to an embodiment of the present disclosure, the six consecutive display pixels are arranged horizontally. An arrangement of the subpixels in each of the display pixels arranged longitudinally is the same.

According to an embodiment of the present disclosure, the horizontal display pixel of the pixel unit and the longitudinal display pixel of the pixel unit are arranged in circulation according to the six consecutive display pixels.

According to an embodiment of the present disclosure, the subpixels in the six consecutive display pixels arranged as BGR, BRG, GBR, GRB, RBG, and RGB successively are repeatedly arranged.

According to the present disclosure, an array substrate comprises a plurality of display pixels arranged in an array. Each of the plurality of display pixels comprises a red subpixel R, a green subpixel G, and a blue subpixel B. Six of the consecutive display pixels arranged horizontally and/or longitudinally as a whole are repeatedly arranged in a pixel unit. An arrangement order of the subpixels in each of the six consecutive display pixels is totally different. The subpixels in the six consecutive display pixels are arranged as RGB, RBG, GRB, GBR, BRG, and BGR successively.

According to an embodiment of the present disclosure, the six consecutive display pixels are arranged longitudinally. Color of each of the subpixels in the same row is identical.

According to an embodiment of the present disclosure, the six consecutive display pixels are arranged horizontally. An arrangement of the subpixels in each of the display pixels arranged longitudinally is the same.

According to an embodiment of the present disclosure, the horizontal display pixel of the pixel unit and the longitudinal display pixel of the pixel unit are arranged in circulation according to the six consecutive display pixels.

According to an embodiment of the present disclosure, the subpixels in the six consecutive display pixels arranged as BGR, BRG, GBR, GRB, RBG, and RGB successively are repeatedly arranged.

According to the present disclosure, a liquid crystal display panel includes an array substrate, a color filter substrate facing to the array substrate, and a liquid crystal layer sandwiched between the array substrate and the color filter substrate. An array substrate comprises a plurality of display pixels arranged in an array. Each of the plurality of display pixels comprises a red subpixel R, a green subpixel G, and a blue subpixel B. Six of the consecutive display pixels arranged horizontally and/or longitudinally as a whole are repeatedly arranged in a pixel unit. An arrangement order of the subpixels in each of the six consecutive display pixels is totally different. The subpixels in the six consecutive display pixels are arranged as RGB, RBG, GRB, GBR, BRG, and BGR successively.

According to an embodiment of the present disclosure, the array substrate adopts a tri-gate structure. The subpixels are arranged horizontally. A row of the subpixels connected to a gate line.

According to an embodiment of the present disclosure, the six consecutive display pixels are arranged longitudinally. Color of each of the subpixels in the same row is identical.

According to an embodiment of the present disclosure, the six consecutive display pixels are arranged horizontally. An arrangement of the subpixels in each of the display pixels arranged longitudinally is the same.

The display effect of the LCD obviously improves by changing the arrangement of subpixels, color mixture of subpixels to compensate pixels under charging for brightness in the present disclosure. In other words, the technical problems of the conventional tri-gate driver structure, such as poor image display and display quality, are resolved due to poor charging ability of pixels which are inclined to incomplete charging. This is the beneficial effect of the present disclosure.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 illustrates a schematic diagram of a pixel of array substrate according to one preferred embodiment of the present disclosure.

FIG. 4 illustrates a schematic diagram of the pixel of the array substrate according to the preferred embodiment of the present disclosure.

FIG. 5 illustrates a schematic diagram of the pixel of the array substrate according to the preferred embodiment of the present disclosure.

DETAILED DESCRIPTION OF THE PREFERRED EMBODIMENTS

Figure 1:
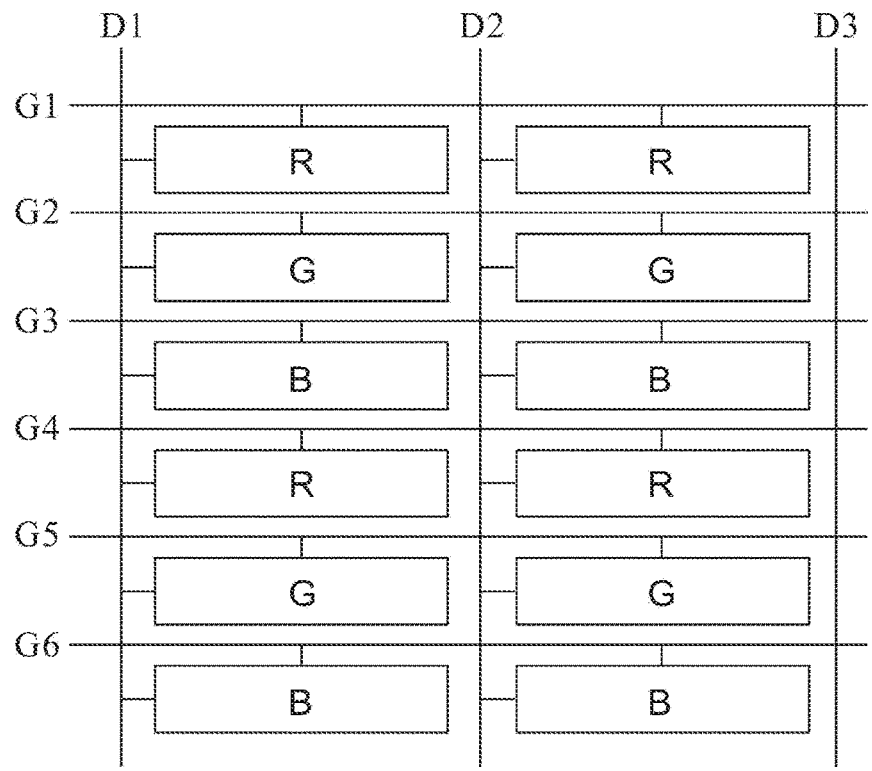
FIG. 1 illustrates two driver structures commonly used by a conventional LCD.
Figure 2:
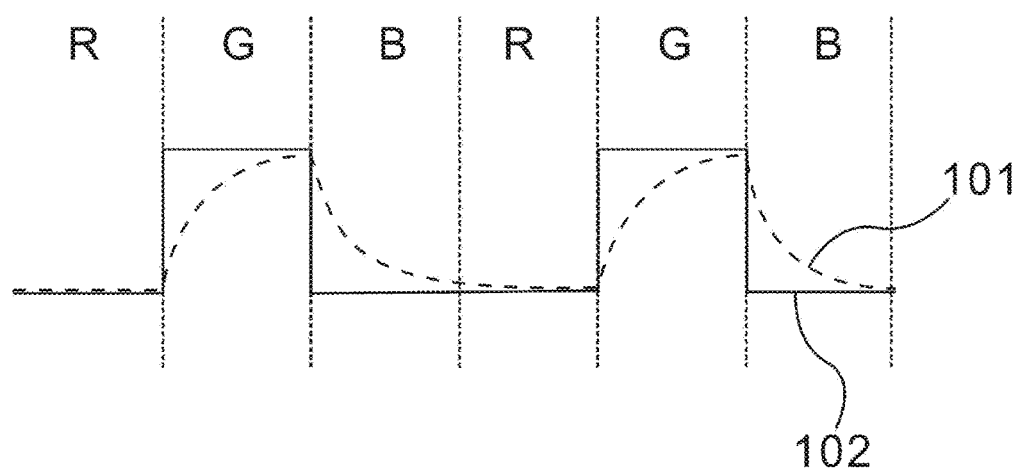
FIG. 2 is a single color image of the tri-gate driver structure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

A conventional tri-gate driver structure is poor for pixel charging ability so inadequate charging easily occurs. Due to inadequate charging, image display is usually lousy, further deteriorating the display quality. The defect can be well resolved with the embodiments of the present disclosure.

According to the present disclosure, an array substrate comprises a plurality of display pixels arranged in an array. Each of the plurality of display pixels comprises a red subpixel R, a green subpixel G, and a blue subpixel B. Six of the consecutive display pixels arranged horizontally and/or longitudinally as a whole are repeatedly arranged in a pixel unit. An arrangement order of the subpixels in each of the six consecutive display pixels is totally different. The subpixels in the six consecutive display pixels are arranged as RGB, RBG, GRB, GBR, BRG, and BGR successively.

Compared with the related art, a subpixel following a green subpixel G is a red subpixel R or a blue subpixel B in the present disclosure. The green subpixel G is constantly bright when the image displays normally. The green subpixel G is mixed with the red subpixel R under charging and the blue subpixel B under charging, which compensates the red subpixel R and the blue subpixel B for brightness. In this way, the display quality is well improved.

The pixel transparent area on the green subpixel G is less than the pixel transparent area on the red subpixel R and the blue subpixel B. This design is a solution to color shift occurring during color mixing due to the green subpixel G with greater brightness.

Embodiment 1

Figures 3, 4:
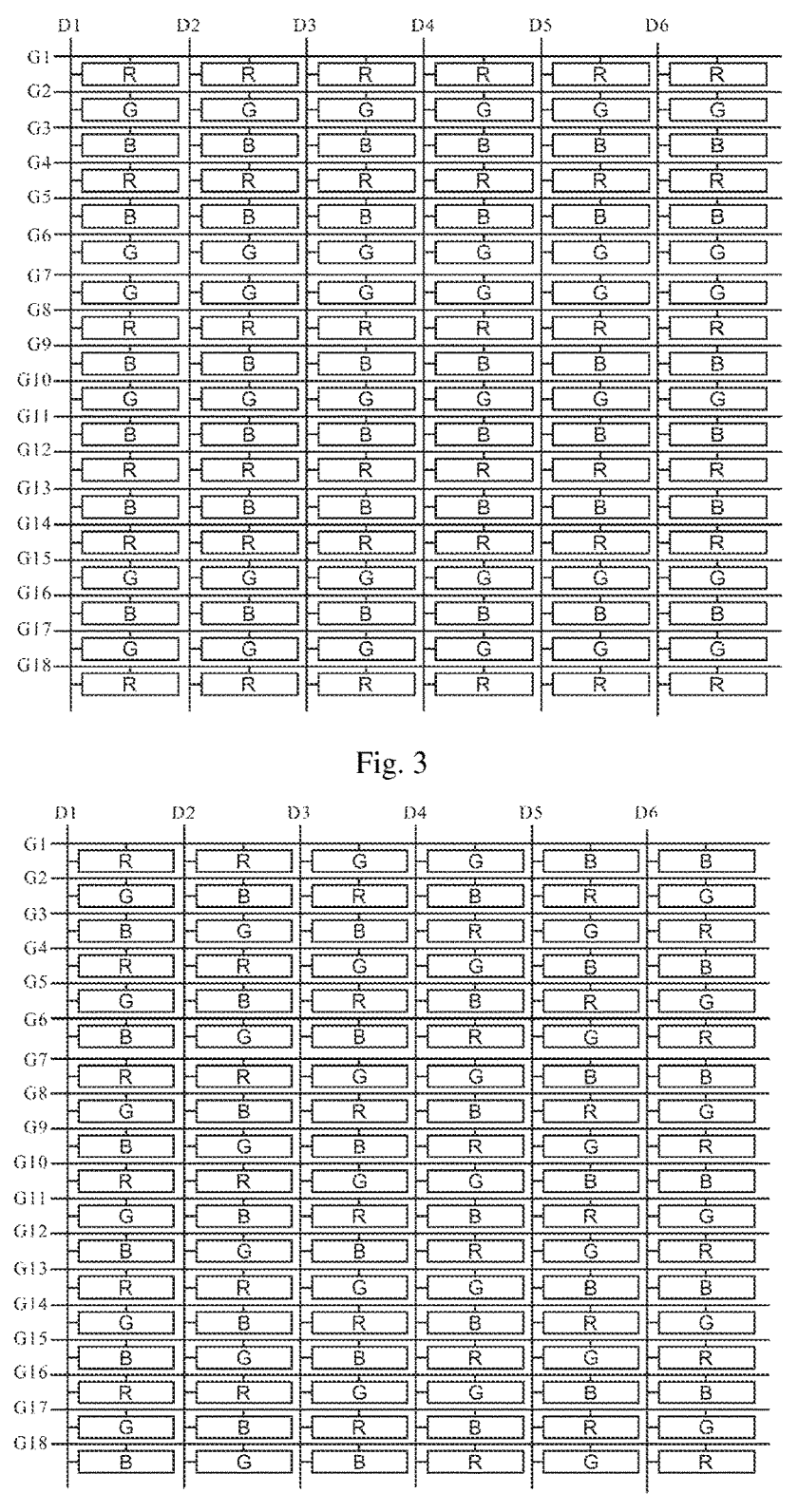

Please refer to FIG. 3 illustrating a schematic diagram of a pixel of array substrate according to one preferred embodiment of the present disclosure. The array substrate includes a plurality of pixel units arranged in an array. Each of the plurality of pixel units includes a red subpixel R, a green subpixel G, and a blue subpixel B. Each column corresponds to a data line. Each row corresponds to a gate line. Six pixel units arranged horizontally and/or longitudinally are repeatedly arranged in circulation in the pixel structure.

The subpixels in each of the six consecutive pixel units arranged longitudinally are arranged in a way of RGB, RBG, GRB, GBR, BRG, and BGR successively. Likewise, the subpixels in each of the six consecutive pixel units are arranged horizontally.

Compared the green subpixel G with the red subpixel R and the blue subpixel B, some of the subpixels are not fully charged when a pure green image is shown. Some of the subpixels and the green subpixel G are mixed in colors so that the problem of color shift is resolved due to inadequate charging. Since the same arrangement of pixels is adopted in different rows, charging waveforms for different rows are identical.

Please refer to FIG. 4 illustrating a schematic diagram of the pixel of the array substrate according to the preferred embodiment of the present disclosure. The array substrate includes the plurality of pixel units arranged in an array. Each of the plurality of pixel units includes the red subpixel R, the green subpixel G, and the blue subpixel B. Each column of the subpixels corresponds to a data line. Each row of the subpixels corresponds to a gate line. The six pixel units arranged horizontally and/or longitudinally are arranged repeatedly in circulation in the pixel structure.

The subpixels in each of the six consecutive pixel units arranged horizontally are arranged as RGB, RBG, GRB, GBR, BRG and BGR successively. Likewise, the subpixels in each of the six consecutive pixel units arranged longitudinally are arranged horizontally.

Compared the green subpixel G with the red subpixel R and the blue subpixel B, some of the subpixels are not fully charged when a pure green image is shown. Some of the subpixels and the green subpixel G are mixed in colors so that the problem of color shift is resolved due to inadequate charging. Since different arrangements of the pixels are adopted in different columns, charging waveform for different columns are different.

Please refer to FIG. 5 illustrating a schematic diagram of the pixel of the array substrate according to the preferred embodiment of the present disclosure. The array substrate includes the plurality of pixel units arranged in an array. Each of the plurality of pixel units includes the red subpixel R, the green subpixel G, and the blue subpixel B. Each column of the subpixels corresponds to a data line. Each row of the subpixels corresponds to a gate line. The six pixel units arranged horizontally and/or longitudinally are arranged repeatedly in circulation in the pixel structure.

The subpixels in each of the six consecutive pixel units arranged horizontally are arranged as RGB, RBG, GRB, GBR, BRG, and BGR successively. Likewise, the subpixels in each of the six consecutive pixel units arranged longitudinally are arranged in the way of RGB, RBG, GRB, GBR, BRG, and BGR successively.

When a pure green image is shown, some of the subpixels are not fully charged compared the green subpixel G with the red subpixel R and the blue subpixel B. Some of the subpixels and the green subpixel G are mixed in colors so that the problem of color shift is resolved due to inadequate charging. Since different arrangements of pixels are adopted in different rows, charging waveforms for different rows are different. Also, since different arrangements of pixels are adopted in different columns, charging waveforms for different columns are different.

According to the present disclosure, a liquid crystal display panel includes an array substrate, a color filter substrate facing to the array substrate, and a liquid crystal layer sandwiched between the array substrate and the color filter substrate. An array substrate comprises a plurality of display pixels arranged in an array. Each of the plurality of display pixels comprises a red subpixel R, a green subpixel G, and a blue subpixel B. Six of the consecutive display pixels arranged horizontally and/or longitudinally as a whole are repeatedly arranged in a pixel unit. An arrangement order of the subpixels in each of the six consecutive display pixels is totally different. The subpixels in the six consecutive display pixels are arranged as RGB, RBG, GRB, GBR, BRG, and BGR successively.

The operating principle of the LCD panel in this embodiment is consistent with the operating principle of the array substrate in the above-mentioned embodiment so the present disclosure will not go into details about the operating principle.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. An array substrate, comprising: a plurality of display pixels arranged in an array; each of the plurality of display pixels comprising a red subpixel R, a green subpixel G, and a blue subpixel B;
    the array substrate adopting a tri-gate structure, the subpixels are arranged horizontally; a row of the subpixels connected to a gate line;
    wherein six of the consecutive display pixels arranged horizontally and/or longitudinally as a whole are repeatedly arranged in a pixel unit; an arrangement order of the subpixels in each of the six consecutive display pixels is totally different;
    the subpixels in the six consecutive display pixels being arranged as RGB, RBG, GRB, GBR, BRG, and BGR successively.

2. The array substrate of claim 1, wherein the six consecutive display pixels are arranged longitudinally; color of each of the subpixels in the same row is identical.

3. The array substrate of claim 1, wherein the six consecutive display pixels are arranged horizontally; an arrangement of the subpixels in each of the display pixels arranged longitudinally is the same.

4. The array substrate of claim 1, wherein the horizontal display pixel of the pixel unit and the longitudinal display pixel of the pixel unit are arranged in circulation according to the six consecutive display pixels.

5. The array substrate of claim 1, wherein the subpixels in the six consecutive display pixels arranged as BGR, BRG, GBR, GRB, RBG, and RGB successively are repeatedly arranged.

6. An array substrate, comprising: a plurality of display pixels arranged in an array; each of the plurality of display pixels comprising a red subpixel R, a green subpixel G, and a blue subpixel B;
    wherein six of the consecutive display pixels arranged horizontally and/or longitudinally as a whole are repeatedly arranged in a pixel unit; an arrangement order of the subpixels in each of the six consecutive display pixels is totally different;
    the subpixels in the six consecutive display pixels being arranged as RGB, RBG, GRB, GBR, BRG, and BGR successively.

7. The array substrate of claim 6, wherein the six consecutive display pixels are arranged longitudinally; color of each of the subpixels in the same row is identical.

8. The array substrate of claim 6, wherein the six consecutive display pixels are arranged horizontally; an arrangement of the subpixels in each of the display pixels arranged longitudinally is the same.

9. The array substrate of claim 6, wherein the horizontal display pixel of the pixel unit and the longitudinal display pixel of the pixel unit are arranged in circulation according to the six consecutive display pixels.

10. The array substrate of claim 6, wherein the subpixels in the six consecutive display pixels arranged as BGR, BRG, GBR, GRB, RBG, and RGB successively are repeatedly arranged.

11. A liquid crystal display panel comprising:
    an array substrate;
    a color filter substrate, facing to the array substrate; and
    a liquid crystal layer, sandwiched between the array substrate and the color filter substrate;
    wherein the array substrate comprises a plurality of display pixels arranged in an array; each of the plurality of display pixels comprises a red subpixel R, a green subpixel G, and a blue subpixel B;
    wherein six of the consecutive display pixels arranged horizontally and/or longitudinally as a whole are repeatedly arranged in a pixel unit; an arrangement order of the subpixels in each of the six consecutive display pixels is totally different;
    the subpixels in the six consecutive display pixels being arranged as RGB, RBG, GRB, GBR, BRG, and BGR successively.

12. The liquid crystal display panel of claim 11, wherein the array substrate adopts a tri-gate structure; the subpixels are arranged horizontally; a row of the subpixels connected to a gate line.

13. The liquid crystal display panel of claim 12, wherein the six consecutive display pixels are arranged longitudinally; color of each of the subpixels in the same row is identical.

14. The liquid crystal display panel of claim 12, wherein the six consecutive display pixels are arranged horizontally; an arrangement of the subpixels in each of the display pixels arranged longitudinally is the same.

* * * * *